United States Patent [19]
Sweeney

[11] 3,993,359
[45] Nov. 23, 1976

[54] HYDRAULIC SOLIDS HANDLING SYSTEM

[75] Inventor: William T. Sweeney, Ponca City, Okla.

[73] Assignee: Continental Oil Company, Ponca City, Okla.

[22] Filed: Apr. 21, 1975

[21] Appl. No.: 570,056

[52] U.S. Cl. .................................. 302/15; 302/53
[51] Int. Cl.² ........................................ B65G 53/30
[58] Field of Search ........................... 302/14–16, 302/29, 52, 53, 57, 58, 51; 222/193, 195

[56] References Cited
UNITED STATES PATENTS

| | | | |
|---|---|---|---|
| 1,337,738 | 4/1920 | Von Porat | 302/57 |
| 1,749,817 | 3/1930 | Hermsdorf | 302/57 |
| 2,072,845 | 3/1937 | Benoit | 222/195 |
| 3,121,593 | 2/1964 | McIlvaine | 302/53 |
| 3,188,144 | 6/1965 | Gmur et al. | 222/195 |

FOREIGN PATENTS OR APPLICATIONS

| | | | |
|---|---|---|---|
| 1,074,419 | 10/1954 | France | 302/53 |
| 264,996 | 3/1970 | U.S.S.R. | 302/15 |

*Primary Examiner*—John J. Love
*Assistant Examiner*—Jeffrey V. Nase
*Attorney, Agent, or Firm*—William J. Miller

[57] ABSTRACT

An apparatus for receiving solids, fluids, slurries, and discharging a slurry stream which has a controlled particulate matter content including a tank with an inlet for passing the above into the tank. A slurry withdrawal region is located in the lower portion of the tank which is in fluid communication with a slurry apparatus including a pump. A plate is mounted above the slurry withdrawal region to restrict the movement of particulate matter into the region. A plurality of liquid jets is positioned around the slurry withdrawal region to fluidize the particulate matter in the withdrawal region.

3 Claims, 4 Drawing Figures

HYDRAULIC SOLIDS HANDLING SYSTEM

This invention relates to an apparatus for receiving solids, liquids, slurries, and mixtures thereof and discharging a slurry stream having a controlled solid content.

DISCUSSION OF PRIOR SYSTEMS

In numerous operations, such as coal mining, coal tends to be produced from the mine phase in surges. These surges are then transported to a location on conveyor, shuttle cart, or other means to a place for storing the coal or transporting the coal out of the mine subsequent to the storage. It is also desirable that the coal is stored as particulate solid in a liquid, and in many instances, it is further desirable that a method be provided for concentrating the solid liquid mixture in storage so that the mixture can be transported at the most economical solids to liquid ratio.

Heretofore, numerous tank arrangements have been used for such purposes; however, various techniques have been necessarily used once the solids have settled and compacted to remove the solid, such as dredge-type removers, tank bottom scrapers, decantation, and the like. Clearly, it is difficult to remove the solids in the form of a slurry; particularly it is difficult to remove the solids having a controlled solids liquid ratio in the slurry mixture from such storage vessels.

BRIEF DESCRIPTION OF THE INVENTION

The present invention comprises an apparatus for removing solids, liquid slurries, and mixtures thereof optionally concentrating such slurries and mixtures and discharging a slurry stream having a controlled solids concentration wherein the apparatus would include a tank having sidewalls and a bottom. An inlet is provided for passing solids, fluids, and slurries and mixtures thereof into the tank, and a slurry withdrawal zone is provided in a lower portion of the tank. A slurry removal means is provided in fluid communication with the slurry withdrawal zone for removing the slurry in that zone to an outlet system and a fluid injection means is positioned below the slurry withdrawal means and in fluid communication with the tank for injecting liquids into the slurry withdrawal zone. Fluidize is defined as: having particles which easily move and change their relative position without a separation of the mass and which easily yield to pressure.

DETAILED DESCRIPTION OF THE INVENTION

Similar numbers will be used throughout the specification for similar elements.

Figure 1:
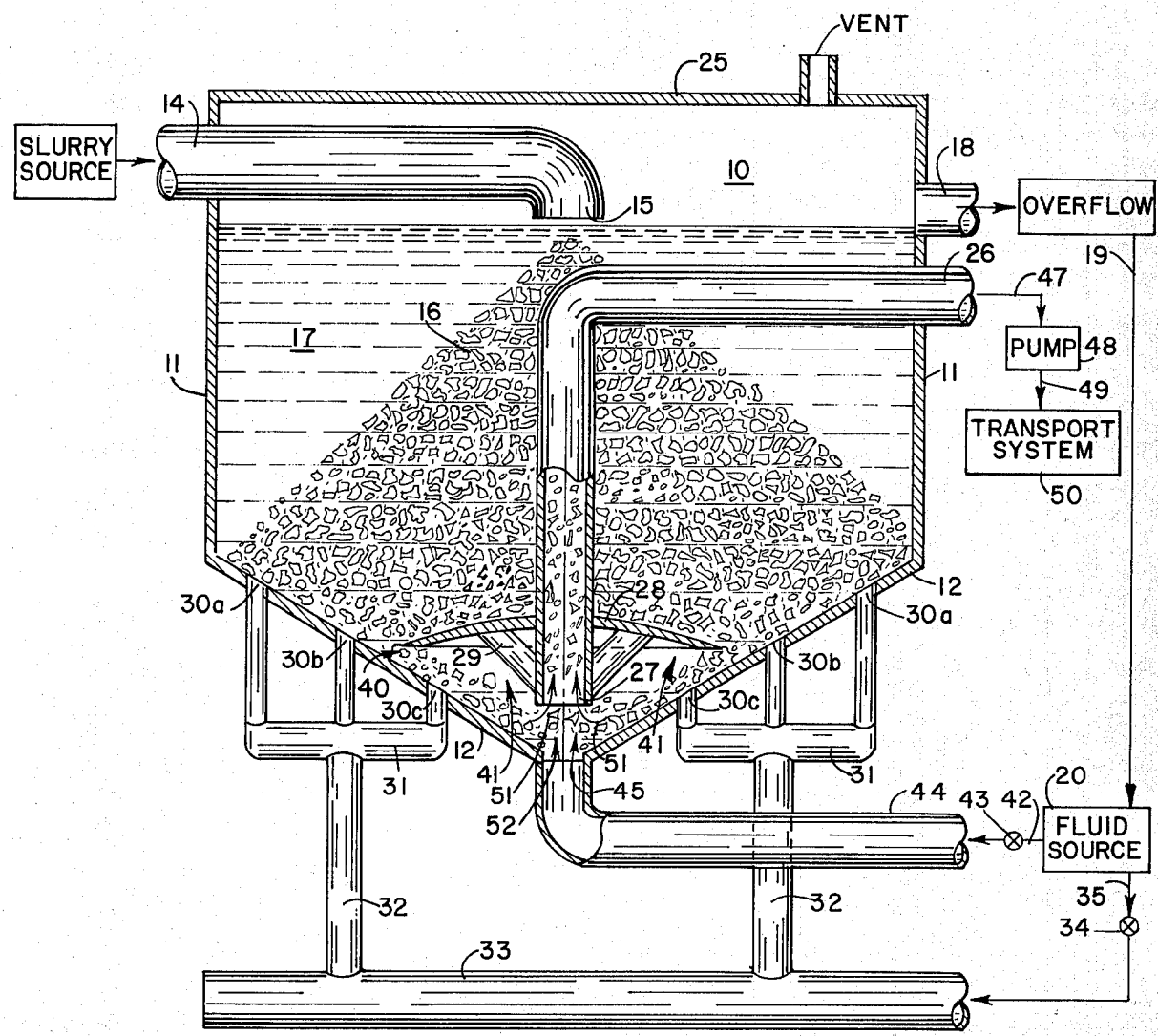
FIG. 1 shows a cross-sectional view of the apparatus of the present invention with the pipe in sectional and full view.

With reference to all of the figures and in particular to FIG. 1, a tank 10 is shown having sidewalls 11 and a bottom 12. Passing through sidewall 11 is an inlet pipe 14 which has an outlet 15 adapted to dump particulate solids material 16, for example, into the interior of tank 10. Along with particulate solids 16, inlet pipe 14 may also have fluid 17 such as water. Excess fluids are decanted from overflow pipe 18 which is connected through pipe 19 to liquid or fluid source 20. Tank 10 may, if desired, contain a top 25. A product output pipe 26 has an inlet 27. A plate means 28 is positioned above inlet 27 and attached to pipe 26. Braces 29 may be attached between plate means 28 and the inlet 27 of pipe 26 to support the plate means and prevent same from collapsing from the weight of particulate matter 16 above plate 28. Plate means 28 may be solid or perforated and can also be made of heavy screen material or any other suitable material which will have sufficient strength to support the weight of the particulate matter above it. A plurality of fluidizing jets 30a, 30b, and 30c are positioned in the bottom of the tank and in fluid communication with a manifold 31 which is connected through pipes 32 and 33 to a valve 34. Fluid source 20 is connected through a pipe 35 to a valve 34. In the embodiment shown in FIG. 1, it should be noted that pipes or jets 30b and 30c are positioned on each side of the terminus of plate 28. The positioning of these jets provides for fluidizing at the narrowest space 40 which the coal must pass in order to reach a slurry withdrawal region defined by arrow 41. In the embodiment shown in FIG. 1, only two sets of slurrying jets 30a through 30c are illustrated. It is obvious, of course, that tank 10 may contain many sets of these slurrying jets spaced around the tank.

The slurry removal system comprises a pipe 42 which is connected to valve 43 and to pipe 44. Outlet 45 is axially aligned with inlet 27 of pipe 26. Material in pipe 26 is removed by a pipe 47 which is coupled to a pump 48. The outlet of pump 48 is coupled through a pipe 49 to a transport system 50.

OPERATION

The operation of this system described in FIG. 1 is as follows: material enters pipe 14 and drops from outlet 15 into tank 10 falling to the bottom 12 of tank 10. The material entering may comprise particulate matter, particulate matter mixed with fluid, or fluid such as water. It is also obvious, of course, that if top 25 is removed, a conveyor can drop particulate matter into the tank. As the material falls, it strikes plate means 28 building up into a pile above plate means 28. When it is desired to remove the material from the tank, fluid source 20 which may be a high pressure pump forces water through pipe 42 and pipe 44 to outlet 45. Valve 43 controls the pressure and the rate of flow of material out outlet 45. As fluid is forced through outlet 45 and into inlet 27, fluid in the slurry withdrawal region 41 and particulate matter 16 is picked up by the movement of the fluid in the direction of arrows 51 and forced into the inlet 27. Pump 48 sucks the material up pipe 26 through pipe 47 and discharges it through pipe 49 to transport system 50.

In order to maintain the concentration in slurry withdrawal region 41 at a desired concentration, jets 30a, 30b, and 30c have fluid applied from fluid source 20 through pipe 35, valve 34, pipes 32 to manifold 31 where it is applied to each of the jets. Valve 34 controls the rate of flow of fluid such as water out of each of the jets 30a through 30c. The movement of the high velocity fluid from jets 30a–30c fluidizes and supports particulate matter 16 letting it fall down the sloping bottom 12 and into the slurry withdrawal region 41. It should be noted here that jets 30b and 30c are placed on each side of the terminus 40 of plate 28. This will prevent sticking of the material as it passes the narrow constriction at the terminus of plate means 28.

The fluidizing effect of jets 30a through 30c moves the particulate matter at a controlled rate into the slurry withdrawal region 41 where it is forced by fluid moving in the direction of arrows 52 and arrows 51 into pipe 26 as previously described. Overflow from tank 10 is provided by pipe 18 which permits water building up in tank 10 to be decanted through pipe 18 to pipe 19 and back to the inlet of liquid source 20. Valve 43 is adjusted so that the flow of water combined with the rate of pump 48 provides sufficient movement of water and particulate matter 16 to develop the proper ratio of particulate matter to fluid being pumped from pump 48 to the transportation system 50. Valve 34 is adjusted to sufficiently agitate particulate matter 16 above and below plate 28 to fluidize the region and permit freedom of movement of particulate matter 16 and fluid 17 into slurry withdrawal region 41.

Figure 2:
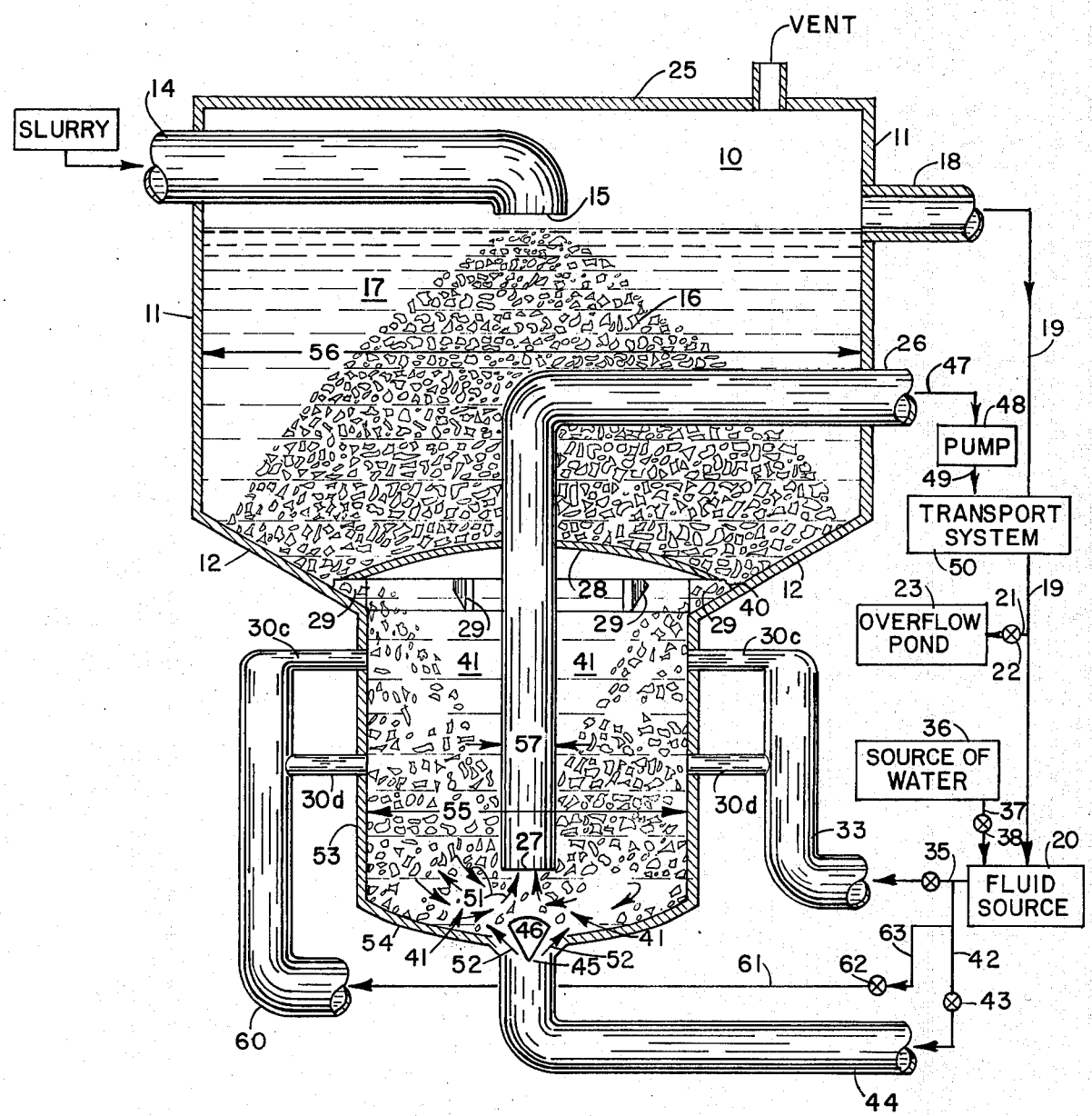
FIG. 2 shows a cross-sectional view of a further embodiment of the apparatus of the present invention.

Referring to FIG. 2, a modified version of FIG. 1 is illustrated. In this version, a lower tank portion extends from bottom 12 and has sidewalls 53 and a bottom 54. Plate means 28 is attached through a plurality of supports 29 between the terminus of plate means 28 and the bottom 12 of tank 10. Each of the support means 29 are trapezoidal shaped pieces of metal which are welded between the underside of plate 28 and the upper side of bottom 12. It is obvious, of course, that any support means can be used to position plate 28 in the proper spaced relationship from bottom 12. Pipe 26 is extended downwardly above the terminus 45 of pipe 44.

A dispersion element 46 is mounted in any usual manner in the outlet 45 of pipe 44 in order to disperse the fluid in the direction of arrows 52. Fluidizing jets 30c and 30d are formed through the side 53 of the lower portion and are connected to a pipe 60, to a valve 62 which connects to pipe 63, and subsequently to fluid source 20. In this embodiment, it is further illustrated that if desired, an overflow pond 23 can be connected to a valve 22, to a pipe 21, to pipe 19; thus in case of the surplusage of water 17 being decanted through pipe 18, valve 20 can be opened and the fluid such as water passed to overflow pond 23. A source of fluid or water 36 is likewise illustrated and can be connected to a pipe 37 and a valve 38 to fluid source 20.

In the embodiment shown, the diameter 56 is at least twice the diameter 55 of the lower portion. Pipe diameter 57 is at least two to ten times smaller than the diameter 55 of lower portion.

Figure 4:
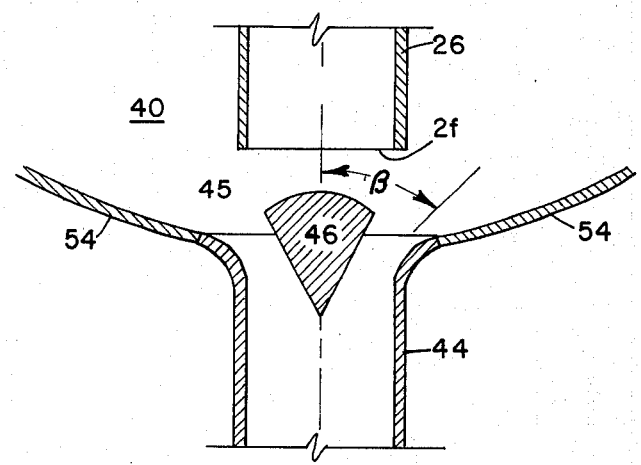

The dispersion element 46 at the terminus 45 of pipe 44 is better illustrated in FIG. 4. The angle of the flow of material or fluid from pipe 44 is illustrated as angle $\beta$ and this angle may be from 10° to about 180° from the longitudinal axis of pipe 44 as illustrated. In this embodiment, valves 43, 62, and 34 are properly adjusted to provide the proper concentration of particulate matter in relationship to the fluid being pumped out of pipe 26 through pipe 27 by pump 48 which discharges into transport system 50. The proper ratios are adjusted normally by opening valve 34 to insure proper fluidizing of the particulate matter in slurry withdrawal region 41. Pump 48 is operated to pull the particulate matter and fluid out of slurry withdrawal region 41. If additional fluid is required, valve 43 is opened, forcing fluid out of outlet 45 the direction of arrows 52. It is obvious, viewing the operation of FIG. 2, that the concentration of slurry can be accurately controlled by the proper amount of fluidizing water and water being added through pipe 44.

Figure 3:
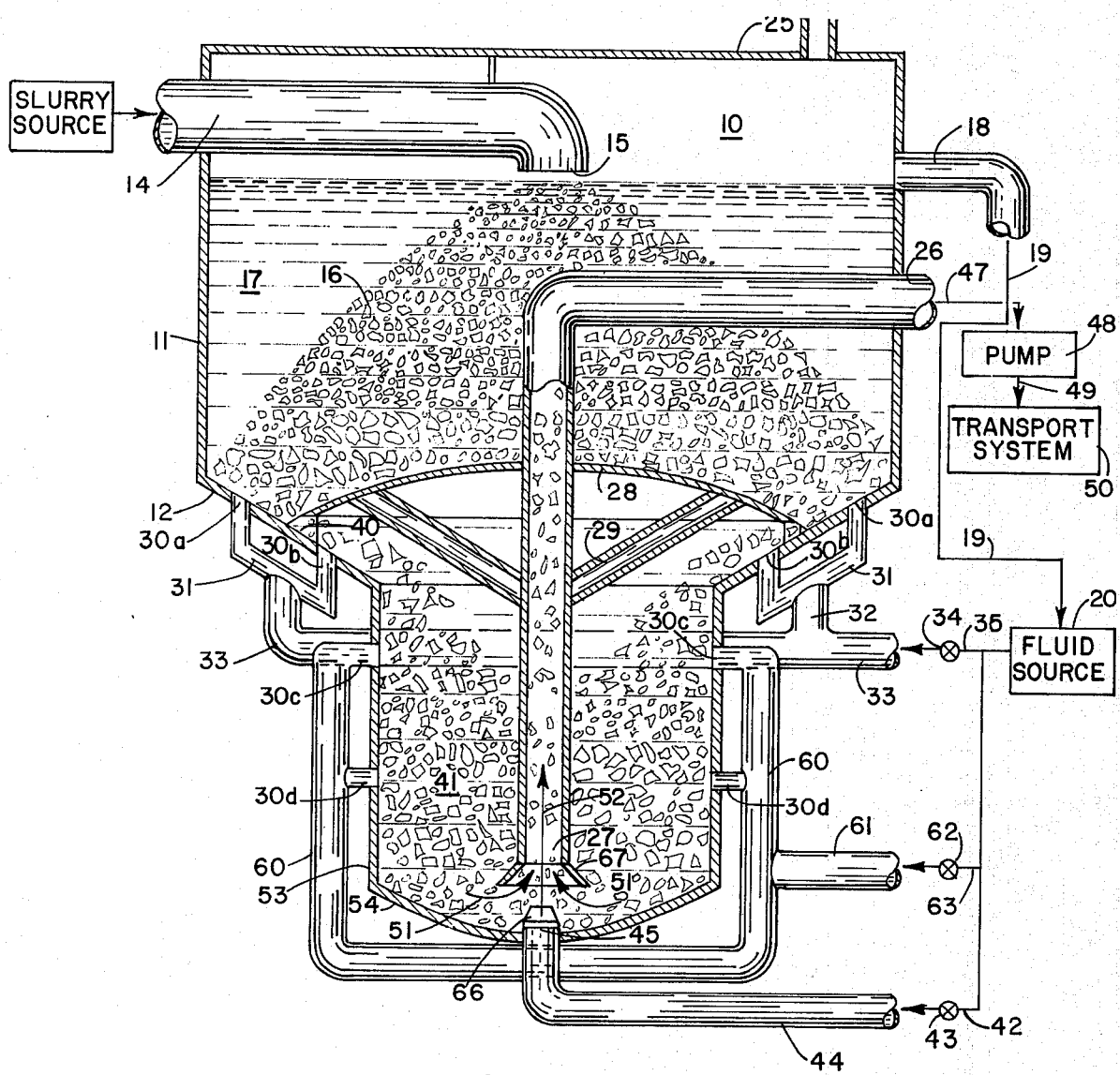
FIG. 3 is a cross-sectional view of an additional embodiment of the apparatus of the present invention; and, FIG. 4 is a cross-sectional view of the desirable arrangement for the liquid injection means.

FIG. 3 is a further embodiment of the device shown in FIG. 2 and differs by the addition of fluidizing jets 30a and 30b through bottom 12. The figure also illustrates the use of a jet eductor 66 and funnel-type arrangement 67 added to the terminus 27 of pipe 26. In this embodiment, valve 43 is adjusted to force fluid at a high velocity in the direction of arrow 52 into the inlet 27. Particulate matter 16 will flow along with the fluid through the opening 27. The funnel arrangement 67 reduces the interference of the terminus 27 to the entrance of particulate matter into pipe 26. In this embodiment as in the previous embodiment, the valves 34, 62, and 43 can all be adjusted to obtain the proper ratio between fluid and particulate matter entering terminus 27 of pipe 26. The apparatus is constructed of materials known to those skilled in the art and commonly used for the construction of coal slurry hoppers and the like, but the materials are well known and need not be discussed further. However, examples of such material are steel, concrete, and the like. It is further obvious that each of the valves 34, 62, and 43, for example, in FIG. 3 could be controlled automatically through a solid monitoring device which could be mounted on pipe 26. It is further obvious, as previously mentioned, that a conveyor could be utilized to deposit material into tank 10 rather than pipe 14. As previously mentioned, it is also obvious that a top 25, while shown, need not necessarily be provided on the tank.

Having thus described the invention, it is pointed out that the embodiments described herein are illustrative, rather than limiting in nature, and that many variables and modifications are possible within the scope of the present invention. Having thus described the invention, What I claim is:

1. An apparatus for receiving solids, liquid, slurries, and mixtures thereof and discharging a slurry stream having a controlled particulate matter content, said apparatus comprising:
   a. a tank means having sidewalls and a bottom;
   b. an inlet means for continuously passing solids, liquids, slurries, and mixtures thereof to form a liquid slurry, into said tank means;
   c. a slurry withdrawal region adjacent the bottom of said tank means;
   d. a slurry withdrawal means in liquid communication with said slurry withdrawal region for withdrawing a slurry stream therefrom;
   e. a pump means having its inlet connected to said slurry withdrawal means;
   f. a plate means mounted above said slurry withdrawal region to restrict the movement of particulate material into said region;
   g. a liquid inlet means positioned below said slurry withdrawal means and in fluid communication with said tank means for injecting liquids into said slurry withdrawal region; and
   h. a plurality of jet means positioned along the bottom of said tank means on each side of said plate means and in fluid communication with the inside of said tank to inject fluid in a manner to prevent the accumulation of solids thereon.

2. The apparatus of claim 1 wherein said slurry withdrawal means has a longitudinal axis and said liquid inlet means directs fluid into said slurry withdrawal zone at an angle from about 10° to about 180° from said longitudinal axis of said slurry withdrawal means.

3. The apparatus of claim 1 wherein said slurry withdrawal region comprises a lower extension below said plate means and having sidewalls and a bottom.

\* \* \* \* \*